c12) United States Patent
Enhos et al.

(10) Patent No.: US 12,176,947 B2
(45) Date of Patent: Dec. 24, 2024

(54) VISIBLE-LIGHT SOFTWARE-DEFINED MODEM

(71) Applicant: Northeastern University, Boston, MA (US)

(72) Inventors: Kerem Enhos, Boston, MA (US); Emrecan Demirors, Boston, MA (US); Tommaso Melodia, Newton, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 0 days.

(21) Appl. No.: 17/804,443

(22) Filed: May 27, 2022

(65) Prior Publication Data

US 2022/0385362 A1  Dec. 1, 2022

Related U.S. Application Data

(60) Provisional application No. 63/194,043, filed on May 27, 2021.

(51) Int. Cl.
*H04B 10/116* (2013.01)
*H04B 10/516* (2013.01)
*H04B 10/67* (2013.01)

(52) U.S. Cl.
CPC ......... *H04B 10/116* (2013.01); *H04B 10/516* (2013.01); *H04B 10/676* (2013.01)

(58) Field of Classification Search
CPC .................................................. H04B 10/116
See application file for complete search history.

(56) References Cited

U.S. PATENT DOCUMENTS

| 3,243,592 | A | * | 3/1966 | Tomiyasu | H04B 14/02 398/189 |
| 2014/0341584 | A1 | * | 11/2014 | Hopewell | H04B 10/50 398/104 |
| 2015/0219765 | A1 | * | 8/2015 | Mead | H01S 3/1616 356/5.09 |
| 2017/0366278 | A1 | * | 12/2017 | Jang | H04B 10/80 |
| 2018/0048390 | A1 | * | 2/2018 | Palmer | H04B 7/0617 |
| 2022/0140903 | A1 | * | 5/2022 | Ooi | H04B 10/11 398/209 |
| 2022/0224414 | A1 | * | 7/2022 | Haas | H04B 10/116 |

FOREIGN PATENT DOCUMENTS

KR  101337915 B1 * 12/2013

OTHER PUBLICATIONS

Md Shafiqul Islam, "Analyzing Visible Light Communication Through Air-Water Interface", IEEE Access, Aug. 30, 2019, All pages (Year: 2019).*

* cited by examiner

*Primary Examiner* — Pranesh K Barua
(74) *Attorney, Agent, or Firm* — Hamilton, Brook, Smith & Reynolds, P.C.

(57) ABSTRACT

A visible light communication (VLC) system transmits and receives visible light signals across a VLC channel that includes an air-water interface. A transmitter may be configured generates and transmits a visible light signal across the VLC channel to a remote device, and a signal modulator controls the transmitter to generate the visible light signal from a digital transmission signal in accordance with a modulation setting. A receiver processes a remote visible light signal received across the VLC channel from the remote device. A signal demodulator converts the remote visible light signal to a received digital signal.

21 Claims, 13 Drawing Sheets

VISIBLE-LIGHT SOFTWARE-DEFINED MODEM

RELATED APPLICATION

This application claims the benefit of U.S. Provisional Application No. 63/194,043, filed on May 27, 2021. The entire teachings of the above application are incorporated herein by reference.

GOVERNMENT SUPPORT

This invention was made with government support under Grant No. 1726512 awarded by the National Science Foundation. The government has certain rights in the invention.

BACKGROUND

Networks of sensors, unmanned aerial vehicles (UAVs) and unmanned underwater vehicles (UUVs), composed of autonomous and wirelessly connected aerial and underwater devices, will play a key role in scenarios and applications where distributed assets in multiple domains (e.g., air and water) operate in unison to accomplish a common goal. Such networks of heterogeneous assets would enable numerous present and future military and civilian applications such as offshore oil and gas exploration and infrastructure monitoring, tactical surveillance, and environmental monitoring (e.g., climate change, pollution tracking, marine life).

Communications across multiple domains have been accomplished through the use of the supplementation of wired channels. For example, communications between a UUV and UAV are typically assisted by a floating relay node that is deployed as a buoy system at the water surface. In such a scenario, the UUV communicates with the floating relay node through an acoustic channel, and the UAV communicates with the floating relay node through a radio frequency (RF) channel. The floating relay node converts communications between the separate acoustic and RF channels to enable the UUV and UAV to communicate.

SUMMARY

Example embodiments include a visible light communication (VLC) system, which may include a transmitter device and/or a receiver device. The transmitter device may include a transmitter and a signal modulator. The transmitter may be configured to generate a visible light signal to be transmitted across a VLC channel to a remote device, the VLC channel including an air-water interface. The signal modulator may be configured to control the transmitter to generate the visible light signal from a digital transmission signal in accordance with a modulation setting. The receiver device may include a receiver and a signal demodulator. The receiver may be configured to receive a remote visible light signal transmitted across the VLC channel from the remote device. The signal demodulator may be configured to convert the remote visible light signal to a received digital signal.

The system may further include a controller configured to adjust at least one of the visible light signal and a communications protocol based on one or more of 1) a command in the received digital signal, 2) metadata associated with the remote visible light signal, 3) sensor data indicating at least one property of the VLC channel, and 4) an output of a machine learning (ML) process. The metadata may include at least one of bit error rate (BER), symbol error rate (SER), packet error rate (PER), throughput, acknowledgement data of packet reception and signal-to-noise ratio (SNR). The at least one property of the VLC channel may include one or more of 1) a distance to the air-water interface, 2) an alignment between the transmitter device and the remote device, 3) waves of the air-water interface, and 4) clarity of water at the air-water interface. The controller may be configured to adjust the visible light signal by modifying at least one of 1) the modulation setting, 2) intensity of the visible light signal, and 3) direction of the visible light signal.

The modulation setting may include at least one of On-Off keying (OOK) modulation, pulse time modulation (PTM), pulse amplitude modulation (PAM), Carrierless Amplitude and Phase Modulation (CAP) modulation, and Orthogonal Frequency Division Multiplexing (OFDM) modulation. The transmitter may include a light-emitting diode (LED) configured to generate the visible light signal at a wavelength between 380 nm and 565 nm. Alternatively or in addition, the transmitter may include a laser configured to generate the visible light signal. The receiver may include a photodetector configured to be responsive to light having a wavelength between 380 nm and 565 nm. The VLC system may be incorporated into at least one of an unmanned aerial vehicle (UAV) an unmanned underwater vehicles (UUV), and a stationary node.

Further embodiments include a visible light communication (VLC) system, which may include a transmitter device and/or a receiver device. The transmitter device may include a transmitter and a signal modulator. The transmitter may be configured to generate a visible light signal to be transmitted across a VLC channel to a remote device, the VLC channel being submerged entirely in water. The signal modulator may be configured to control the transmitter to generate the visible light signal from a digital transmission signal in accordance with a modulation setting. The receiver device may include a receiver and a signal demodulator. The receiver may be configured to receive a remote visible light signal transmitted across the VLC channel from the remote device. The signal demodulator may be configured to convert the remote visible light signal to a received digital signal.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
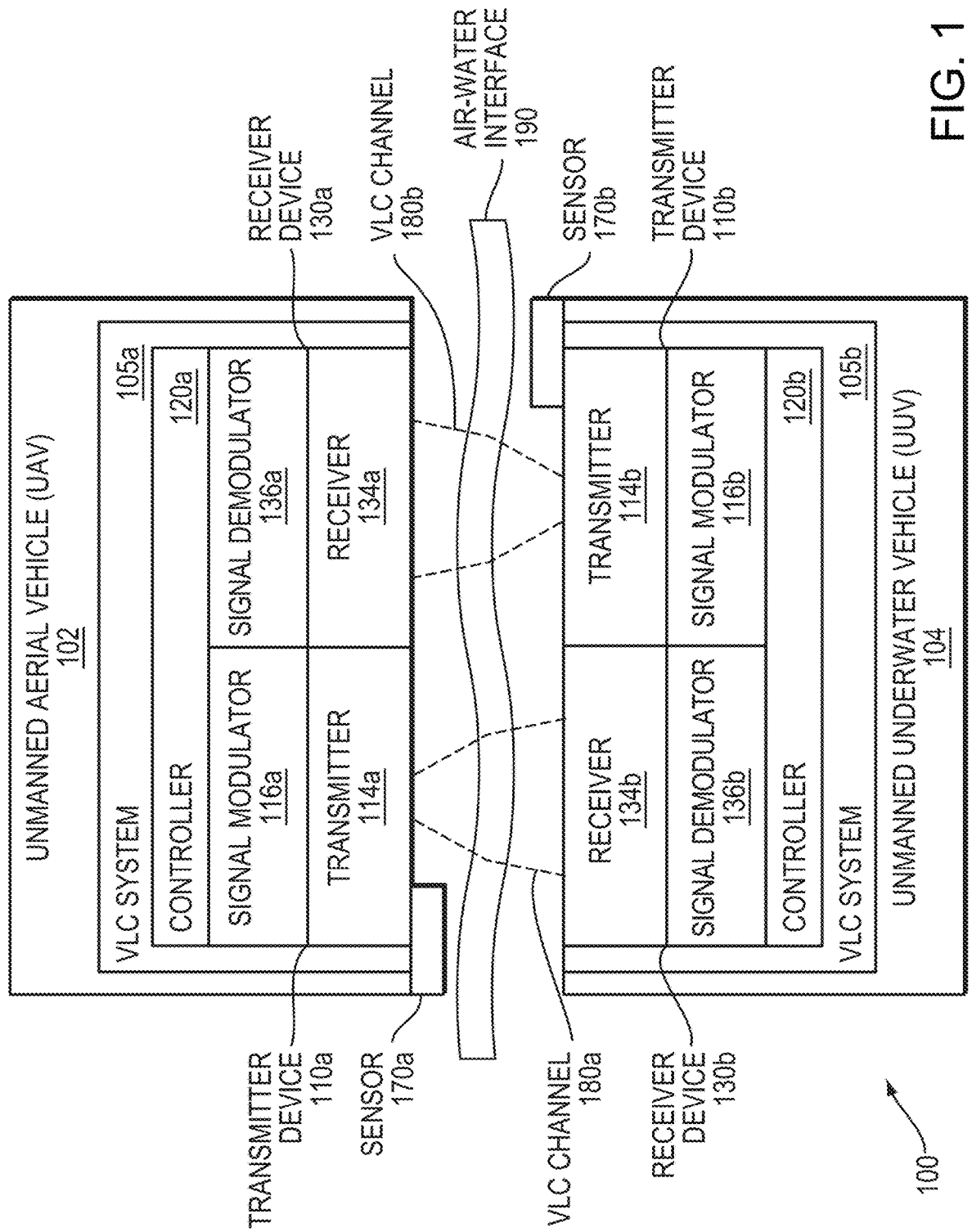
FIG. 1 is a diagram illustrating unmanned vehicles implementing visible light communication (VLC) to communicate through an air-water interface in one embodiment.

A description of example embodiments follows.

Networks of sensors, unmanned aerial vehicles (UAVs) and unmanned underwater vehicles (UUVs), composed of autonomous and wirelessly connected aerial and underwater devices, will play a key role in scenarios and applications where distributed assets in multiple domains (e.g., air and water) operate in unison to accomplish a common goal. However, establishing a robust, bi-directional communication link between aerial and underwater assets, across the air-water interface has not been accomplished or even suggested in existing approaches, and, thus, is still uncharted territory.

Currently, the only viable way to establish a communication link between aerial and underwater assets is to deploy floating devices that are capable of relaying data. For example, floating buoys equipped with both acoustic and RF communication capabilities have been widely used as gateways between underwater and terrestrial networks. Yet such floating buoy systems are vulnerable to environmental effects such as ocean dynamics (e.g., drifts, currents or surface waves) and harsh weather conditions. Moreover, in military or other critical applications, they can be easily detected, tampered with, jammed, or deactivated. Buoys may also significantly limit the operational area of aerial and underwater assets that are relying on them, as it may be prohibitive to deploy them vastly in terms of time and cost over large ocean areas. While using autonomous surface vehicles (ASVs) as gateways nodes could alleviate some of the deployment challenges like ocean dynamics, it is still far from addressing all the aforementioned limitations. An alternative approach to establish communication links between underwater and terrestrial networks is operating UUVs to continuously resurface and act as relays or data mules. Similar to relying on floating devices, using UUVs in such mode would substantially limit operational capabilities and raise severe security issues.

Example embodiments provide a visible light communication (VLC) system that enables aerial and underwater assets to establish bi-directional links through an air-water interface, without requiring any relay nodes, using software-defined visible light networking. Example VLC systems implement a software-defined radio (SDR) paradigm to provide both aerial and underwater nodes with robust, secure, and self-optimizing communication functionalities for operating in temporally and spatially varying and potentially contested environments.

The effectiveness of example embodiments is demonstrated below through modeling of optical propagation of an air-water interface. A mathematical model of the visible light channel across the air-water interface is derived to characterize the limitations imposed by the water surface distribution, optical properties and path loss. Specifically, the effects of distance, misalignment between transmitter and receiver, water surface waves, and water clarity are investigated. A simulator was built that can generate 3D channel models to evaluate these effects.

Example embodiment may implement a visible light software defined modem as described below. In one example, a VLC modem may be implemented on a reconfigurable System-on-Chip (SoC) architecture incorporating a field programmable gate array (FPGA) and a general-purpose processing unit. In addition, the VLC modem may interface with a visible light front-end including a) light emitting diode (LED) driver circuitry and LEDs (e.g., 465 nm blue LEDs) on the transmitter chain, and b) a silicon avalanche photodetector with high responsivity at a target light band (e.g., 450-480 nm) and a variable gain amplifier (VGA) on the receiver chain.

Example embodiments were tested through experimental evaluation in a test tank and in the ocean to evaluate the performance of the software-defined VLC modem. Different modulation schemes were tested to compare their performance under different noise conditions. The effects of distance, misalignment, water clarity, surface waves, and background noise were also tested and observed with respect to the performance of an example VLC system. The experimental results were cross-validated with simulation results. Further, a set of experiments were conducted in the ocean to demonstrate example VLC systems can communicate through the air-water interface bi-directionally in real-world scenarios.

FIG. 1 illustrates a network 100 of unmanned vehicles implementing visible light communication (VLC) to communicate through an air-water interface 190 in an example embodiment. As shown, an unmanned aerial vehicle (UAV) 102 is airborne and located above the surface of a body of water, and is above an unmanned underwater vehicle (UUV) 104 submerged below the body of water. The UAV 102 and UUV 104 may communicate via respective on-board VLC systems 105a-b to transmit and receive communications signals via VLC channels 180a-b across the air-water interface 190.

The VLC systems 105, 106 may each include a transmitter device 110a-b and a receiver device 130a-b. The transmitter device 110a-b may include a transmitter 114a-b and a signal modulator 116a-b. The transmitter 114a-b may be configured to generate a visible light signal to be transmitted across the VLC channel 180a-b, through the air-water interface 190, to a receiver of a remote device. The transmitter may include a light-emitting diode (LED) configured to generate the visible light signal at a wavelength between 400 nm and 550 nm. Alternatively or in addition, the transmitter may include a laser configured to generate the visible light signal. In visible light communication carried out by example embodiments, transmitting light sources can be either LEDs or lasers that have appropriate modulation bandwidth capability that enables high data rate communication. While LEDs are advantageous in terms of wide view angle, they have lower modulation bandwidth (5-10 MHz) relative to lasers, which are high power directional sources that can operate in much wider bandwidth (e.g., multiple GHz). With the development of manufacturing of visible light spectrum lasers at lower wavelengths, high data rate and longer distance communication with the limited beamwidth can be maintained. Example embodiments may exhibit a modular architecture, thus being capable of using multiple different, replaceable transmitter front ends that utilize LEDs or lasers, without modification to the remaining architecture, according to the needs of the application. In utilizing a range of different LEDs and laser visible light sources, example embodiments may transmit signals via a number of different modulation schemes including Optical-OFDM (DCO-OFDM, ACO-OFDM, FLIP-OFDM, etc.), CAP, OOK, 8b/10b, PPM, DPIM, PWM, PSK, WDM, and PAM.

The signal modulator 116a-b may control the transmitter 114a-b to generate the visible light signal from a digital transmission signal in accordance with a modulation setting. The receiver device 130a-b, in turn, may include a receiver 134a-b and a signal demodulator 136a-b. The receiver 134a-b may be configured to receive a remote visible light signal transmitted across the VLC channel 180a-b from the remote device. The signal demodulator 136a-b may be configured to convert the remote visible light signal to a received digital signal. The receiver may include a photodetector configured to be responsive to light having a wavelength between 400 nm and 550 nm.

The VLC system 105a-b may further include a controller 120a-b configured to adjust the visible light signal based on data indicating the quality of a prior visible light signal as received by the remote device. For example, this data may include one or more of 1) a command in the received digital signal, 2) metadata associated with the remote visible light signal, and 3) sensor data from one or more sensors 170a-b indicating at least one property of the VLC channel 180a-b. The metadata may include, for example, a bit error rate (BER) and/or signal-to-noise ratio (SNR). The at least one property of the VLC channel may include one or more of 1) a distance to the air-water interface, 2) an alignment between the transmitter device and the remote device, 3) waves of the air-water interface, and 4) clarity of water at the air-water interface. Thus, the sensors 170a-b may include sensors to detect and/or measure one or more of the aforementioned properties. In response, the controller 120a-b may be configured to adjust the visible light signal by modifying one or more of 1) the modulation setting (e.g., On-Off keying (OOK) modulation, Carrierless Amplitude and Phase Modulation (CAP) modulation, and Orthogonal Frequency Division Multiplexing (OFDM) modulation), 2) intensity of the visible light signal, and 3) direction of the visible light signal.

The transmitter device 110a-b, receiver device 130a-b and/or controller 120a-b may incorporate a software-defined architecture that enables flexible and adaptive communication protocols for different environments and applications. Using the VLC systems 105a-b in a software-defined networking (SDN) manner enables swarm control of various underwater and aerial nodes by ensuring communication in both air and underwater environments. The capability to communicate through the air-water interface 190 eliminates the need for of surface nodes such as buoys. Further embodiments may also be implemented for communications that are entirely underwater, such as between two UUVs. In such an application, the VLC channel is entirely submerged in water, and the VLC systems may be configured without regard for an air-water interface.

Example embodiments thus provide direct, robust, high data rate, full duplex, and bi-directional communication between underwater and aerial nodes across an air-water interface. Adaptive data rate and flexibility on the communication protocols ensures successful communication links in different mediums and extends the communication range according to each communication channel. Higher bandwidth, higher data rate, and lower latency can be accomplished in underwater scenarios compared to acoustical communication. Software defined networking enables control of underwater and aerial nodes as a swarm. Further, more secure communication can be established with the directional nature of VLC compared to the omnidirectional transmission schemes of RF or acoustic communication. Usage of software-defined architecture also enables cost efficiency by reducing service, compatibility, and hardware implementation costs.

Example VLC systems can be used for unmanned underwater and aerial vehicles by enabling communications across air-water interface with high bandwidth, robust, and bi-directional communication. As a result, positioning data of underwater vehicles, which uses inertial positioning systems (e.g., submarines, industry or military grade ROVs), can be updated without surfacing these vehicles. Such VLC systems can be used for offshore oil and gas exploration, infrastructure monitoring, tactical surveillance, software-defined networks, multi-domain operations, environmental monitoring and multi-domain swarm control.

Figure 2:
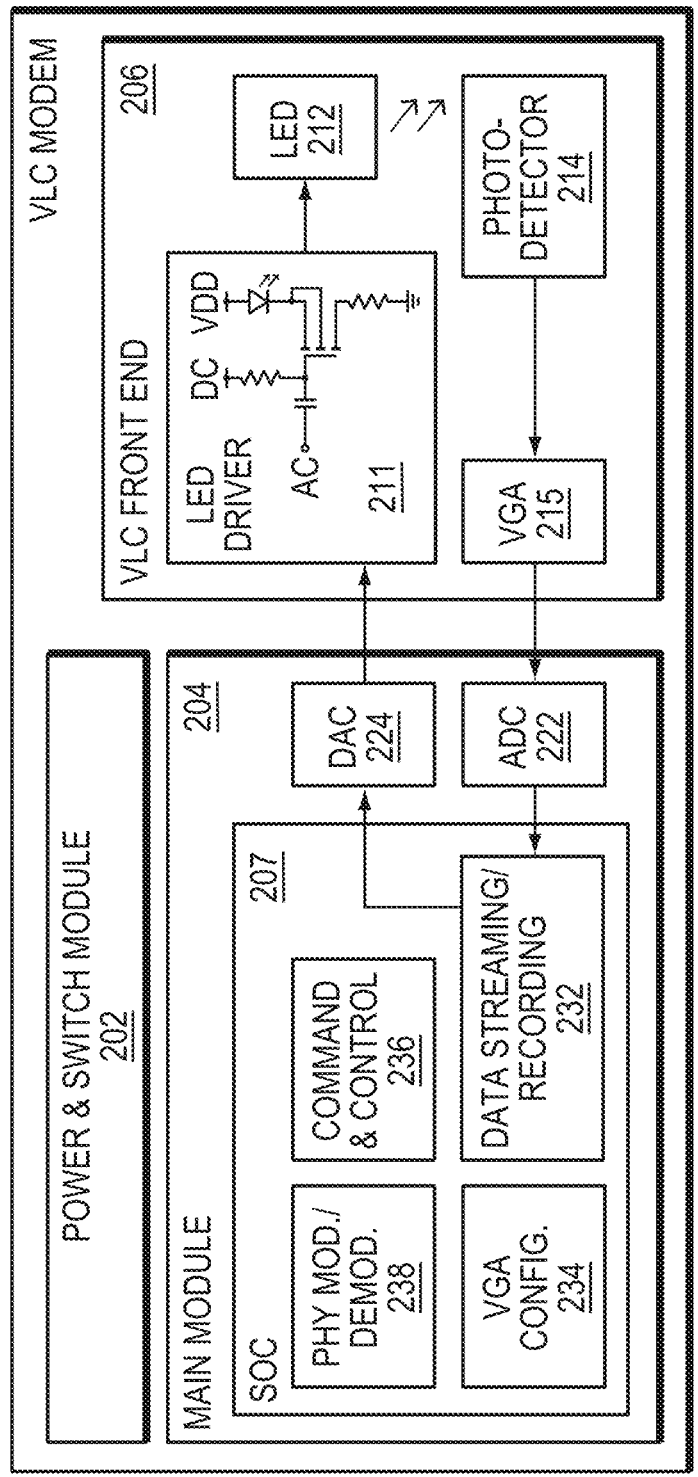
FIG. 2 is a block diagram of a VLC system in further detail.

FIG. 2 is a block diagram of a VLC system 105 in further detail. The VLC system 105 may include a VLC front-end 206, a main module 204, and a power and switch module 202. The VLC front-end 206 and main module 204, in particular, may incorporate features of the transmitter device 110a-b, receiver device 130a-b, and controller 120a-b described above. The power and switch module 202 may interface the VLC system 105 to a battery (e.g., Lithium-ion battery, not shown) and integrate surge suppression circuitry for avoiding any surges. The module 202 may incorporate multiple voltage regulators to provide each individual module with different voltages (e.g., ±5V and ±15 V). Further, the module 202 may incorporate a set of connectors for carrying analog and digital signals between different modules. For example, the module 202 may interface the main module 204 to the VLC front-end 206 to facilitate visible light communications.

The VLC front-end 206 may include a transmitter side and a receiver side. At the transmitter side, a LED 212 may be driven by a LED driver 211. For example, the driver 211 may include a circuit having an n-channel MOSFET with common source topology with source degeneration. The AC input signal of the driver 211 may be biased with an appropriate DC level to turn on the transistor. This DC bias may be supplied to the LED driver by the switch module, which may supply a TTL level DC bias when the transmission command is generated through the main module. As a result, the LED 212 may be turned off when a VLC transmission is not occurring. Rather than amplifying the current outputted from the DAC 224, to account for a limited output current, a voltage controlled current source may be implemented by using the MOSFET. Thus, the current on the load on the drain pin of the MOSFET (the LED 212) may be controlled by the voltage at the gate of the MOSFET. The maximum current drain may also be limited with the resistor on the source pin of the MOSFET. The LED 212 may include multiple LEDs (e.g., 465 nm blue LEDs) connected in series to the drain of the MOSFET of the driver 211. For example, each LED may be driven with current of 1 Amp peak-topeak, thus outputting an average power of 1.5 W, with typical radiant flux of 727 mW.

At the receiver side, the VLC front-end 206 includes a photodetector 214 (e.g., a silicon avalanche photodetector) for receiving remote VLC signals. The photodetector 214 may be configured to have high responsivity at the frequency band of the VLC signals to be detected (e.g., 400-550 nm or 450-480 nm) and may exhibit high transimpedance bandwidth (400 MHz). The photodetector 214 may have a transimpedance amplifier, the gain of which may be controllable with a knob or other setting. After image-to-voltage conversion by the photodetector 214, the voltage output signal may be amplified by a variable gain amplifier (VGA) 215. The gain of VGA 215 may be controlled digitally by the main module 204 as described below, varying gain values between 0-50 dB, for example. In example embodiments, the VLC front-end 206 may be operated through a custom built PCB, which incorporates LEDs, LED driver, and photodetector. VGA circuit is built on a separate PCB which is connected as a bridge between the power and switch module by using PCI Express connectors. Connection between the VLC front end 206, main module 204, and power and switch module 202 may be provided through micro-coaxial cables or comparable channels.

The main module 204 may provide a number of processing and control functions as described herein. The module 204 may include, for example, a programmable system-on-chip (SoC) 207 integrating field-programmable gate array (FPGA) and ARM processors on a single substrate. Such an implementation can provide hardware and software reprogrammability, with compact packaging and low energy consumption. Alternatively, the components of the SoC 207 may be implemented in a range of hardware and/or software as known in the art, and may be implemented as one or more separate components. The main module 204 may also house an analog-to-digital converter (ADC) 222 and a digital-to-analog converter (DAC) 224 for transmitting and receiving signals from the VLC front-end 206.

The data streaming/recording module 232 may interface with the DAC 224 and ADC 222 to forward digital data for transmission by the VLC front end 206 and to capture/record digital data converted from a remote VLC signal received by the VLC front end 206. A physical signal modem 238 may operate as a signal modulator to control the VLC front end 206 (e.g., transmitter) to generate a visible light signal from a digital transmission signal provided by the data streaming/recording module 232 in accordance with a modulation setting. The modem 238 may also operate as a signal demodulator to demodulate a received signal to digital data. The variable gain amplifier (VGA) configuration block 234 may store a configuration setting for the VGA 215 of the receiver chain at the front end 206.

A control module 236 may incorporate features of the controller 120a-b described above. In particular, the control module 236 may communicate with the signal modem 238, VGA configuration block 234, data streaming/recording module 232, and the VLC front end 206 to adjust a transmitted visible light signal based on data indicating the quality of a prior visible light signal as received by a remote device. For example, the control module 236 may process such data including a command or metadata component of a received digital signal parsed by the data streaming/recording module 232, as well as sensor data from one or more sensors 170a-b indicating properties of the VLC channel 180a-b. In response, the control module 236 may be configured to adjust the visible light signal by 1) controlling the signal modem 238 to modify the modulation settings of transmitted signals, 2) controlling the LED driver 211 to adjust the intensity of the visible light signal, and/or 3) controlling the orientation and/or position of the VLC front-end 206 to adjust the direction of the visible light signal. Similarly, to improve the reception of received visible light signals, the control module 236 may adjust 1) the settings of the VGA 215 via the VGA configuration block 234, 2) the demodulation settings of the signal modem 238, and/or 3) the settings, position and/or orientation of the photodetector 214. As a result, the VLC system 105, using software-defined architecture, may be responsive to changing environmental conditions and feedback from remote devices to dynamically reconfigure the transmitter and receiver chains to optimize transmission and reception of visible light signals.

In example embodiments, the control module 236 and controller 120a-b may incorporate data-driven solutions to facilitate and make more efficient data transfer and other networking operations. Usage of statistical information over the network control with the help of artificial intelligence or machine learning algorithms can lead to optimal configuration in different communication conditions. On the transmitter chain, for example, reinforcement learning techniques can be leveraged to obtain adaptive communication protocols without the need of any feedback information from the receiver side. Due to the lack of spectrum allocation for visible light communication, mechanisms that can intelligently optimize networking operations according to the data driven solutions obtained with the usage of artificial intelligence (AI) and machine learning (ML) algorithms enables robust communication for VLC systems in example embodiments. A wide range of AI/ML-based solutions, including physical layer control, modulation recognition, adaptive communication, effective medium access control, efficient power control of communication systems and self-optimizing modulation and coding, can be implemented by the control module 236 and controller 120a-b in example embodiments.

The VLC system 105 may operate in multiple different modes. For example, in a first mode, it may operate as a VLC modem, executing a software-defined communication protocol stack via the SoC 207. In a second mode, it may operate similarly to a commercial-off-the-shelf (COTS) software-defined radio platform, where the protocol stack is implemented on a host computer (not shown) connected to the VLC system 105 via an Ethernet connection. In this mode, the VLC system 105 may allow the host computer to control, stream and record data through the VLC front-end 206, thereby facilitating testing and prototyping operations.

Figure 3:
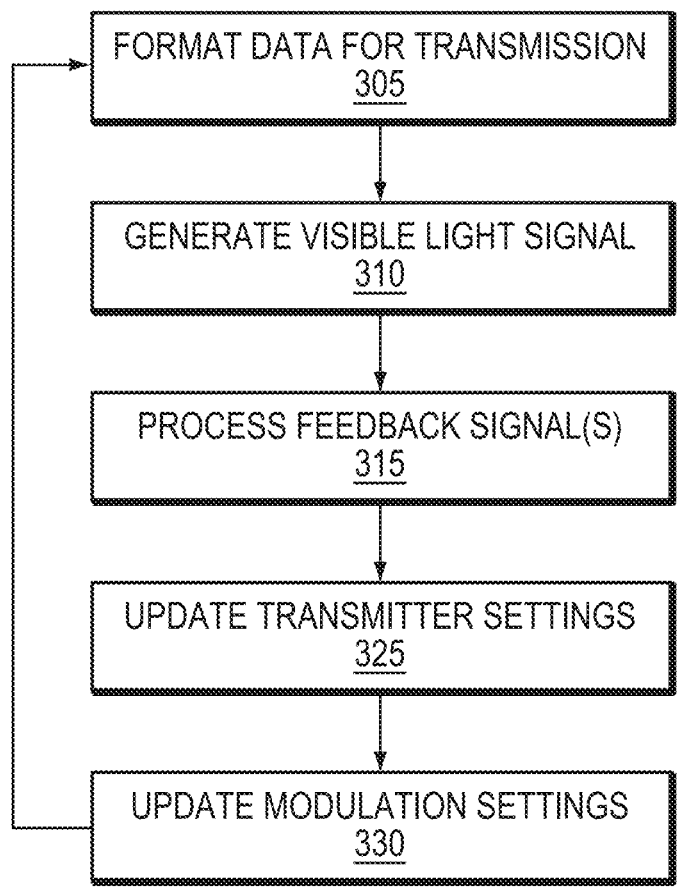
FIG. 3 is a flow diagram of a process of transmitting a visible light signal in one embodiment.

FIG. 3 is a flow diagram of a process 300 of transmitting a visible light signal in one embodiment. With reference to FIGS. 1 and 2, at a VLC system 105, the data streaming/recording module 232 may format digital data for transmission (305). Upon analog conversion by the DAC 224, the LED driver 211 may drive the LED to generate the corresponding visible light signal in accordance with a given modulation setting (310). Prior to subsequent transmission, the control module 236 may process one or more feedback signals indicating the quality of the transmitted signal and/or properties of the VLC channel, as described above (315). Based on this feedback, the control module 236 may update settings of the transmitter, such as the intensity of the VLC signal and/or the position/orientation of the transmitter relative to a remote device receiving the VLC signal (325). The control module 236 may also update modulation settings at the signal modem 238 based on this feedback, for example by altering the modulation scheme and/or a data rate (330). As a result, the transmitter and modulation settings may be optimized for transmission of further VLC signals.

Figure 4:
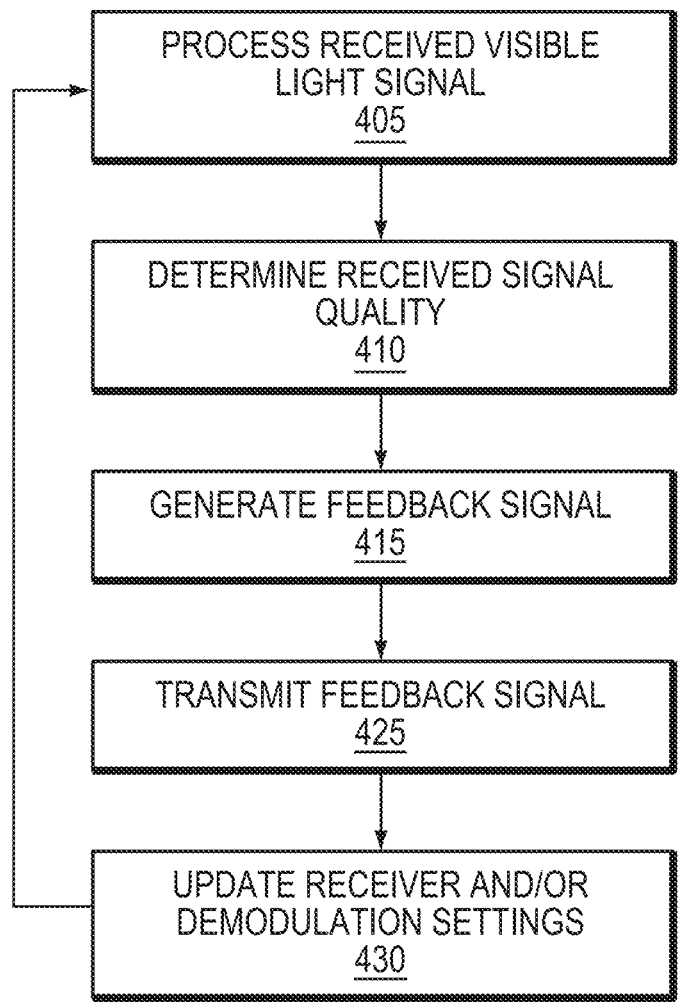
FIG. 4 is a flow diagram of a process of processing a received visible light signal in one embodiment.

FIG. 4 is a flow diagram of a process 400 of processing a received visible light signal in one embodiment. With reference to FIGS. 1 and 2, at a VLC system 105, the photodetector 214, VGA 215, ADC 222 and data streaming/recording module 232 may operate as described above to process a received visible light signal (405). The control module 236 may then analyze the processed signal to determine metrics indicating the quality of the received signal, such as bit error rate (BER) and signal-to-noise ratio (SNR) (410). If such metrics exceed a predetermined threshold, the control module 236 may take action to inform the remote device to repeat the transmission and/or update settings at the remote device. To do so, the control module 236 may command the data streaming/recording module 232 to generate a feedback signal, which may indicate the determined metrics and/or specific settings to be updated (415). The VLC front end 206 may then transmit the feedback signal 425 to the remote device (425). Further, the control module 236, based on the received signal and/or the determined signal quality, may update settings of the receiver, such as the sensitivity of the photodetector 214 and/or the position/orientation of the photodetector 214 relative to a remote device transmitting the VLC signal (430). The control module 236 may also update demodulation settings at the signal modem 238 based on this feedback, for example by altering the demodulation scheme and/or a data rate. As a result, the receiver and demodulation settings may be optimized for reception of further VLC signals.

FIG. 5A-D are plots illustrating a simulation of a VLC signal transmitted across a VLC channel that may be generated in example embodiments. The plots were generated using a modeled VLC transmitter. The light path graphs (FIGS. 5A and 5C) are shown for $\phi=0°$ of the cylindrical coordinate system. Illumination area graphs (FIGS. 5B and 5D) are shown. Modeling of the air-water VLC channel is helpful to characterize the system capabilities and define the limitations imposed by the water surface distribution, optical properties and path loss. After obtaining the necessary parameters that affect communication through the air-water interface channels, modeling can guide the design of communication systems and shed light on the performance to be expected.

To generate the simulated results shown, a mathematical model may be first derived for the water surface, which is the main factor affecting propagation in an air-water interface communication channel. The surface wave may be modeled with a third-order Stokes' wave. Through the model, the water surface elevation may be determined for different horizontal coordinates at different times. Consequently, each ray of light's trajectory can be geometrically calculated to determine the coverage area that can be illuminated by a VLC transmitter with a ray tracing approach. To perform accurate trajectory calculations, the water surface model generated, the distances of transmitter and receiver above and below the water surface, air and water distance, and field of view of the transmitting source can be modeled. The incident angle can be derived by calculating the angle between the transmitted ray and the orthogonal slope of the tangent of the water surface. Then by using the Snell's law, the refraction angle can be calculated. Lastly, by calculating the slope of the refracted ray, the horizontal coordinate of the incident ray at the depth of receiver can be determined. To extend the coverage area results into a 3D surface area, the trajectory calculations can be repeated for each azimuth angle in a cylindrical coordinate system.

Finally, the light intensity (irradiance) can be calculated inside the coverage area determined by accounting for the path loss imposed by the air-water interface. First, the irradiance at the water surface can be calculated through the inverse square law. Then, at the water surface, the Fresnel equations can be used to calculate the amount light penetrating into the water medium. Inside the water medium, two components of path loss are effective. The first is the beam attenuation caused by the absorption and scattering of water while the second is the geometric loss, caused by the spreading of the beam over the traveling distance of light. Considering all path loss components, the received light intensity can be obtained at a specific point in the cylindrical coordinate system.

Figure 5A:
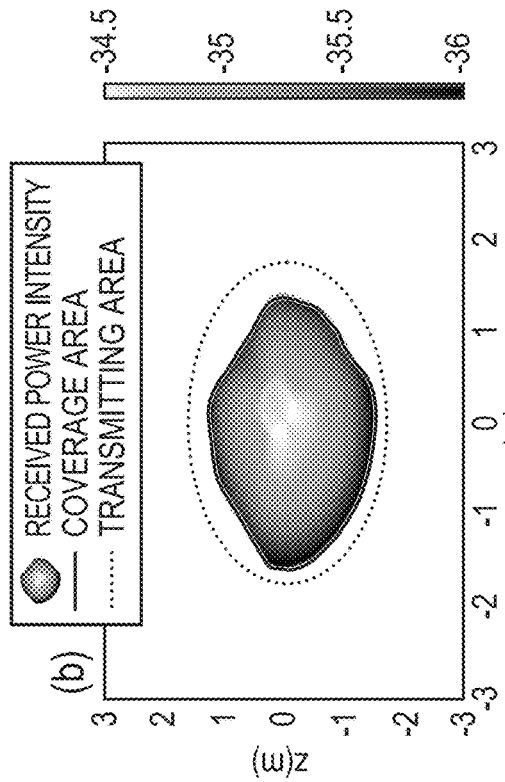
FIG. 5A-D are plots illustrating a simulated VLC signal in one embodiment.
Figure 5B:
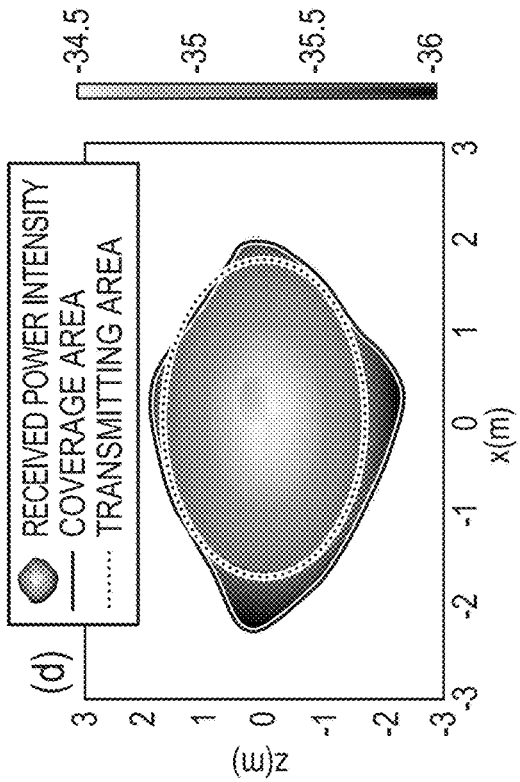
Figure 5C:
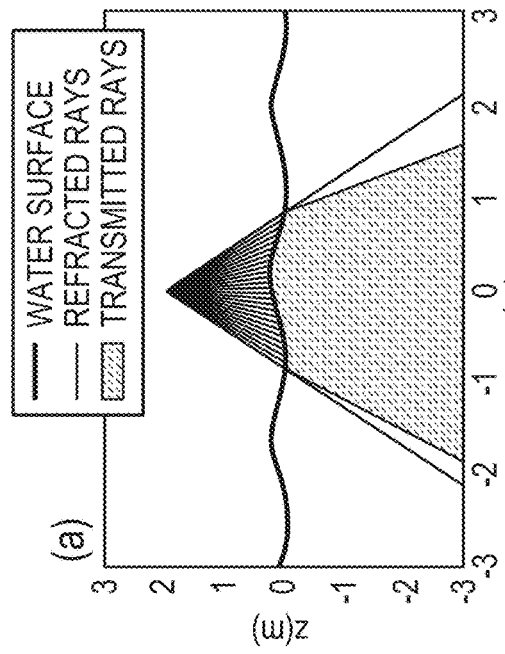
Figure 5D:
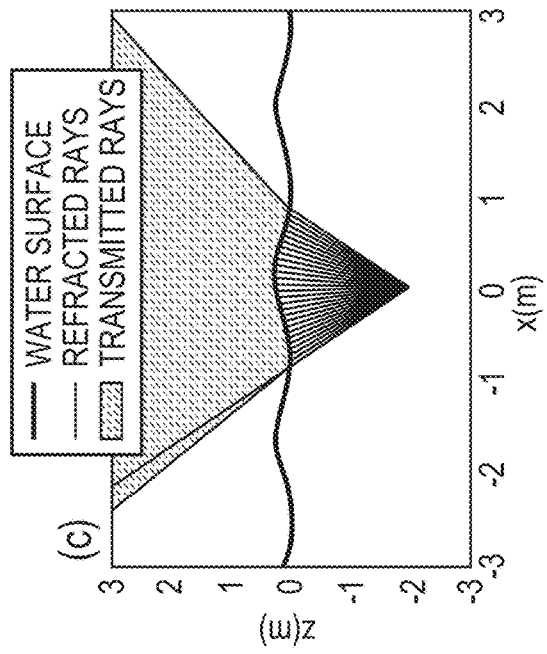
Figure 6B:
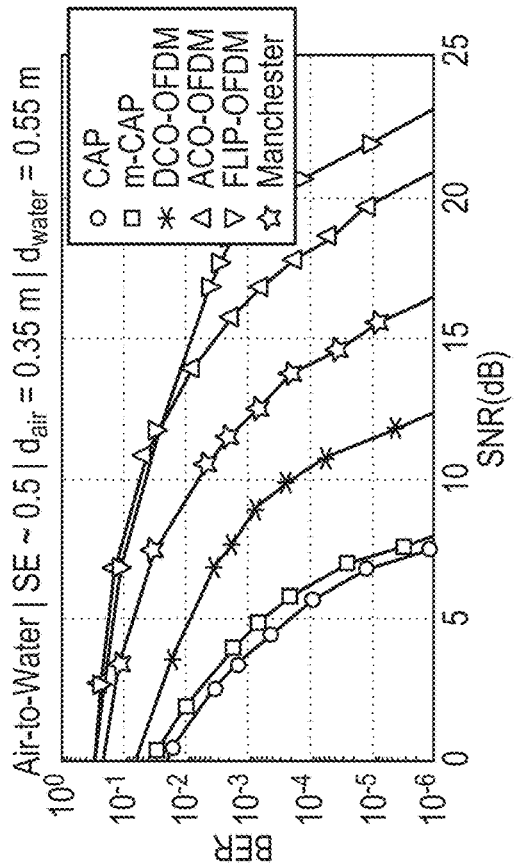
FIG. 6A-D are graphs illustrating bit error rate (BER) as a function of signal-to-noise ratio (SNR) of a received VLC signal in one embodiment.
Figure 6D:
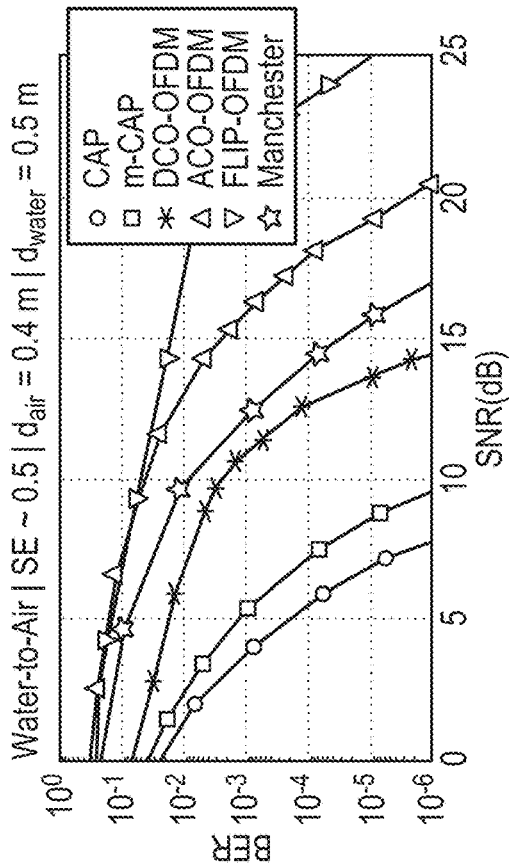
Figure 6A:
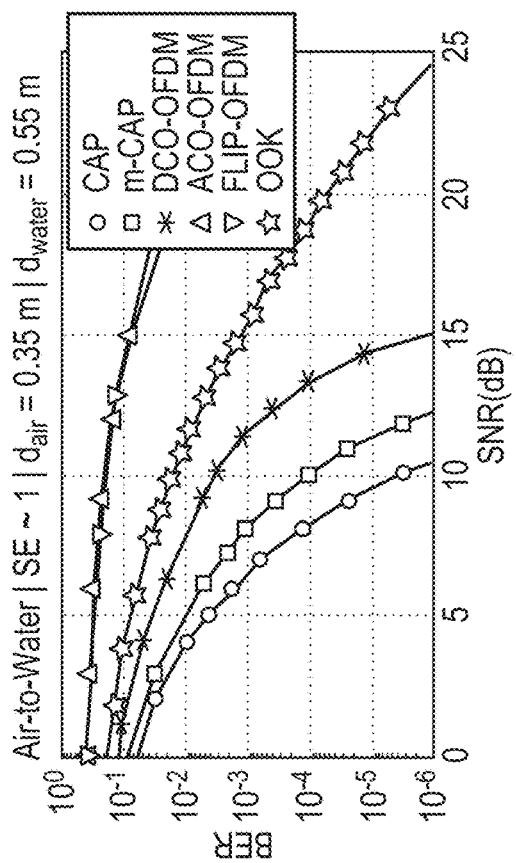
Figure 6C:
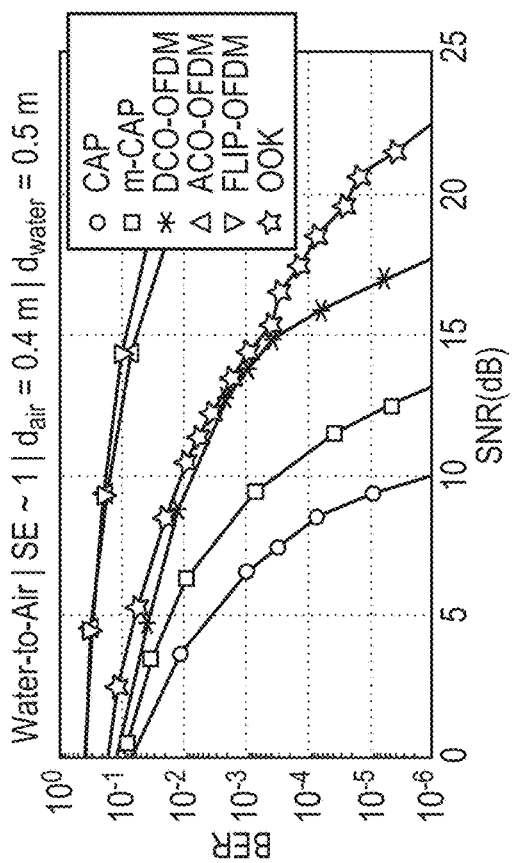

Leveraging the channel model developed, a VLC channel simulator can be implemented for the air-water interface. In an example embodiment, the simulator may be realized through MATLAB and may be capable of simulating 3D air-water VLC channels. As an example, shown in FIGS. 5A and 5C, a VLC channel for a water surface with 25 cm waves present, is simulated through the simulator developed. Coverage area and irradiance calculations for each cases of air-to-water (A2W) and water-to-air (W2A) channels are simulated for each azimuth angle as shown in FIGS. 5B and 5D. The coverage areas that would occur if there were no air-water medium transitions in the channel are shown with black dashed lines (labelled as transmitting area). Because of the refractive index difference between two mediums, for the A2W case the coverage area is smaller than the transmitting area while for the W2A case the coverage is larger than the transmitting area. As it can be observed from this example, the simulator developed is capable of providing irregularity of the coverage area boundaries, light intensity distribution at varying temporal and spatial settings. Because calculation of incident illumination intensity at specific distance can be achieved with this simulator, with known transmitted electrical power of the light source and the noise level of the receiver, signal-to-noise ratio (SNR) can be obtained for the desired channel setting. Thus, for different environmental conditions, channel configurations, and position of aerial or underwater assets, the simulator enables preforming link and network level evaluations. Furthermore, the simulator can guide and feed vital insights to the network operators or automatic control algorithms for deploying the multi-domain assets efficiently to achieve the best operational results in example embodiments.

Exemplifications

Example implementations of the VLC system 105 described above were modeled, built and operated to test and observe their performance in simulated, laboratory and real-world settings. Results of this work is described below with reference to FIGS. 6-12. First, different modulation schemes are tested and their performance is compared under different channel conditions across the air-water interface. Then, the effects of distance, misalignment, water clarity, surface waves and background noise to the performance of the VLC modems communication across the air-water interface is tested and evaluated. The experimental results are also cross-validated with the simulation results obtained from the simulator developed. Finally, a set of experiments are conducted in the ocean to showcase that example embodiments can operate in a real-world scenario.

Modulation Scheme Analysis

As described below, different modulation schemes are compared as implemented on the software-defined VLC modem over a bidirectional air-water channel in terms of the BER performance. Unlike RF or acoustic communication systems where modulation schemes can leverage amplitude, frequency, and phase, in VLC systems, the intensity of the light is modulated. Such modulation schemes are referred as intensity modulation and direct detection (IM/DD) schemes.

As described herein, both single carrier modulation schemes (i.e., On-Off keying (OOK)) and multi carrier modulation schemes (i.e., Carrierless Amplitude and Phase Modulation (CAP) and Orthogonal Frequency Division Multiplexing (OFDM)) which are commonly used in underwater VLC systems are implemented and compared.

Single Carrier Modulation Schemes: OOK is the simplest and most intuitive solution for IM/DD in VLC, as high or low light intensity represents the incoming binary data bits. A simple modification applied to OOK is called Manchester Encoding (ME). Although this encoding requires twice the bandwidth, it is less susceptible to noise compared to OOK. Hence, spectral efficiencies of OOK and ME schemes are inherently 1 and 0.5 bit/s/Hz respectively.

Multi Carrier Modulation Schemes (MCM): CAP stands out as a spectrally efficient multi carrier modulation scheme widely used in VLC. CAP scheme enables the trade-off between spectral efficiency and BER performance through adjusting its parameters (e.g., span, samples-per-symbol (SPS), roll-off factor, etc.) and can provide better peak to average power ratio (PAPR) and BER performance compared to other multi carrier schemes. Multi-band CAP (m-CAP) scheme can be established by summing up multiple CAP scheme waveforms applied with different center frequencies of pulseshaping filters. Optical OFDM is also a widely adopted scheme in VLC, thanks to its robustness against inter-symbol interference (ISI) and multipath fading. Unlike its RF-based counterparts, Optical OFDM schemes cannot use complexvalued bipolar signals. To address that, two major variants of OFDM schemes are widely adopted. First is called DCbiased Optical OFDM (DCO-OFDM), which converts bipolar signals to usable unipolar signals by adding DC offset. The latter is called Asymmetrically Clipped Optical OFDM (ACOOFDM) which adopts a computational technique that uses only odd subcarriers. Similar variation to ACO-OFDM is called FLIP-OFDM. Although it depends on transmission of positive and negative components in two consecutive symbols, FLIPOFDM offers the same spectral efficiency as ACO-OFDM.

For a fair comparison between single and multi-carrier modulation schemes, OOK and ME are compared separately with MCM. Spectral efficiencies of MCM schemes are configured to be comparable with the stated single carrier modulation schemes.

Test Results: In the tests described below, OOK, CAP, m-CAP (m=5), DCO-OFDM, ACO-OFDM, and FLIPOFDM are implemented and tested. For prototyping and testing purposes, each modulation scheme is implemented as MATLAB scripts and generated waveforms are fed into VLC modems' FPGA via a secure shell protocol over Ethernet as described herein. In this set of experiments, 1 MHz of bandwidth is utilized. To obtain a fair BER comparison between different modulation schemes, the parameters of all multi carrier schemes (i.e., CAP and OFDM) are adjusted to the minimum possible modulation order. In all OFDM schemes, FFT size is selected to be 64 and channel equalization is done by using $N_s/4$ number of pilots, where $N_s$ is the number of total subcarriers. For achieving packet detection and synchronization, each data packet is preceded by a 511-length pseudo-noise (PN) sequence preamble. During the experiments, two VLC modems are pre-aligned with a 6 ft aluminum rod in a water test tank, as it can be seen from FIG. 4 (a), thus minimizing and fixing the pointing loss. It is important to note that all experiments are conducted for both air-to-water (A2W) and water-to-air (W2A) channels in a dark room and with flat water surface in order to eliminate other factors that can affect communication.

FIG. 6A-D are graphs illustrating bit error rate (BER) as a function of signal-to-noise ratio (SNR) of a received VLC signal in one embodiment. BER analysis is shown for both air-to-water and water-to-air configurations with spectral efficiencies of 1 and 0.5 bit/s/Hz. Five sub-bands are used for m-CAP scheme, and utilized bandwidth is equal for each test. It can be observed that CAP and m-CAP outperforms all other modulation schemes in all communication directions (A2W or W2A) and spectral efficiencies. For ACO- and Flip-OFDM schemes, due to their low bandwidth efficiency, modulation order was set to 16-QAM and 4-QAM for spectral efficiencies of 1 and 0.5 bit/s/Hz respectively, which results in relatively worse performance. Thus, DCOOFDM is the best performing OFDM-based scheme. Even though DCO-OFDM needs higher SNR at same BER compared to CAP modulation, it still outperforms OOK in every configuration.

It is also observed that communication direction (A2W or W2A) has no substantial effect on the BER performance of different modulation schemes. More specifically, for each modulation scheme, at same BER, required SNR level increases approximately 1 dB, if configuration is W2A instead of A2W. This is mainly due to the reflection and scattering underwater. Thus, due to total internal reflection, portion of light rays that can penetrate to air medium decreases. However, for A2W case, all the light rays with irradiance angle less than 90°, can penetrate to water medium, where the intensity of light increases by means of reflections inside the water medium.

Figure 7:
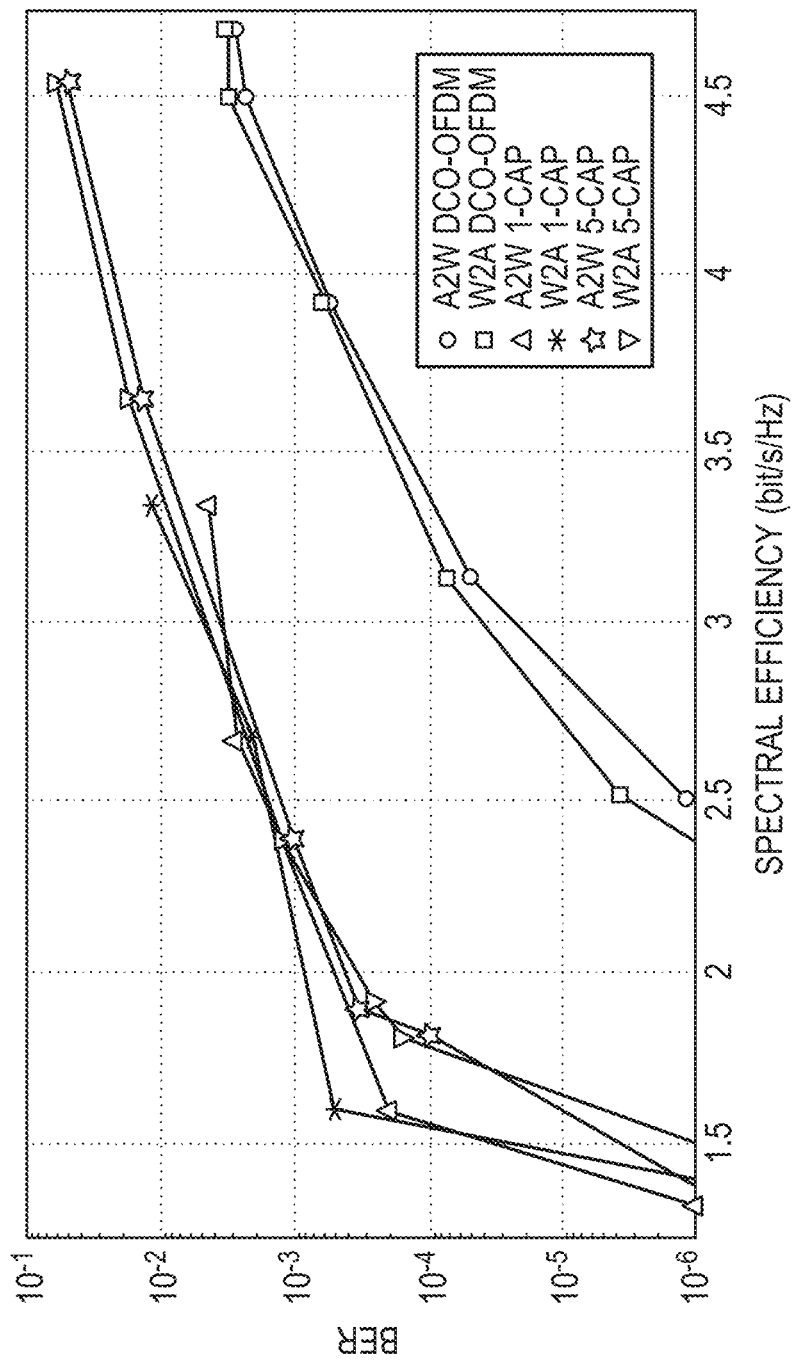
FIG. 7 is a graph illustrating BER as a function of spectral efficiency of a received VLC signal in one embodiment.

FIG. 7 is a graph illustrating BER as a function of spectral efficiency of a received VLC signal in one embodiment. The graph indicates maximum feasible data rates for CAP, 5-CAP and DCO-OFDM schemes. Dashed lines represent BER values for water-to-air VLC link and solid lines are for the air-to-water link.

After comparing all the modulation schemes for VLC across the water surface, it is shown in FIGS. 6A-D that CAP and DCOOFDM outperforms others in both configurations and different spectral efficiencies. For DCO-OFDM, PAPR is measured to be 11.25 dB and 12.56 dB for spectral efficiencies of 1 and 0.5 bit/s/Hz respectively. While for CAP, these values decrease to 4.41 dB and 6.75 dB. However, for 5-CAP, PAPR values measured to be the highest among these schemes as 12.55 dB and 14.33 dB. Moreover, in FIG. 7, CAP, 5-CAP and DCO-OFDM are compared in terms of their maximum feasible data rate (BER vs Spectral Efficiency) for both A2W and W2A configurations. Although both configurations resulted in very similar outcomes, it is observed that DCO-OFDM can support higher data rates with better BER performance in the same given bandwidth.

Channel Analysis

To observe the impact of distance and misalignment between VLC modems, horizontal (x-axis) and vertical (z-axis) distances are differentiated. Thus, one of the modems is attached to a crane that can move in these directions and the submerged modem is fastened to a small mushroom anchor keeping the modem at a fixed location. Length of the rope between the mushroom anchor and modem can also be adjusted to vary water distance $d_{water}$. Air distance $d_{air}$ is increased with 0.05 m intervals by moving the crane vertically. These measurements are done iteratively for different distances between photodetector and water surface, $d_{water}$ with 0.1 m intervals.

Similarly, for a specific $d_{air}$, impact of misalignment between two modems can also be observed as described herein. The only difference is that the crane is moved horizontally. After aligning the transmitter and receiver modems in y-axis, crane moved in x-axis with 0.1 m steps while the submerged modem remained at the same point. In both A2W and W2A configurations modems are located with a distance of 0.42 m to the water surface unless otherwise stated.

During this set of experiments, transmission power is kept at maximum and gain of the VGA on the receiver side is fixed. Hence, electrical noise level of the receiver is assumed to be equal for each configuration. In this way, despite of huge differentiation between the signal amplitude, contribution of the AWGN on the RMS value of the received signal remains the same. Incident optical power can be described as $$P_{opt} = \frac{V_{out}}{R(\lambda) \times G}$$

where Vout is the output voltage of the photodetector, $R(\lambda)$ is the detector's responsivity at a given wavelength, and G is the transimpedance gain. In FIGS. 8A-B and 9A-B, intensity is given in dB scale of W/m2 units, which is also obtained from the irradiance calculations described below.

Figure 8A:
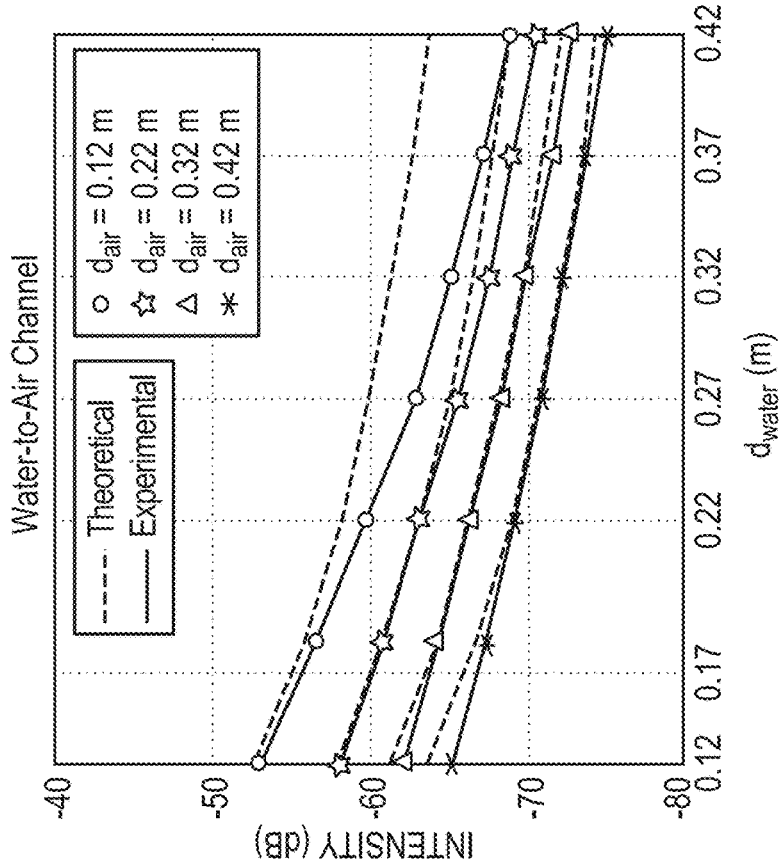
FIGS. 8A-B are graphs illustrating intensity as a function of distance of a received VLC signal in one embodiment.
Figure 8B:
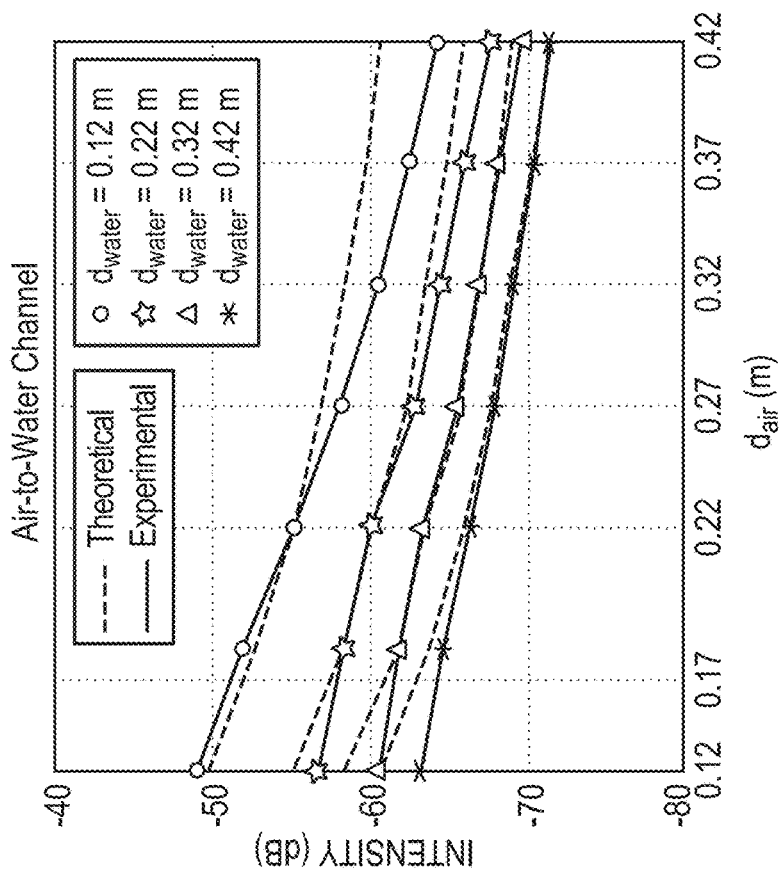

FIGS. 8A-B are graphs illustrating irradiance (light intensity) as a function of distance of a received VLC signal in one embodiment. The graphs depict the impact of distance variation on light intensity for air-to-water (FIG. 8A) and water-to-air (FIG. 8B) configuration is shown in solid lines. Theoretical values are also included in dashed lines for the purpose of validation of the implemented model. Although test values are consistent with the theoretical values, some deviation is observed for the cases where the modem is placed within a distance to water surface less than 0.17 m for both A2W and W2A configurations. Also, it is observed that the light intensity is decreased by approximately 3 dB for W2A configuration, mainly due the total internal reflection.

As the developed simulation model is cross-validated through the experimental results, it is used for further estimating the maximum separation distance between the VLC modems based on SNR values. For the desired BER level, corresponding required light intensity, which can also be converted to a specific SNR value with the assumption of a constant AWGN, is known as described herein. Therefore, the required light intensity, which is obtained and validated through DCO-OFDM BER analysis under different noise conditions, for maintaining the maximum communication distance can be calculated by simulating the channel model. Considering that, the maximum separation distance for VLC modems to successful communicate with a BER less than $10^{-6}$ is calculated for each channel with our proposed system's power specifications. If the modem in air medium is placed at $d_{air}$=0.1 m, maximum depth that the modem underwater can be placed is $d_{water}$=2.351 m. Contrarily, if the modem underwater is placed at $d_{water}$=0.1 m, maximum height that the modem in air can be located is $d_{air}$=2.403 m. If the separation between the modems and water surface is equal, maximum communication distance is calculated as $d_{air}$=$d_{water}$=1.239 m, which results in total of 2.478 m.

Figure 9A:
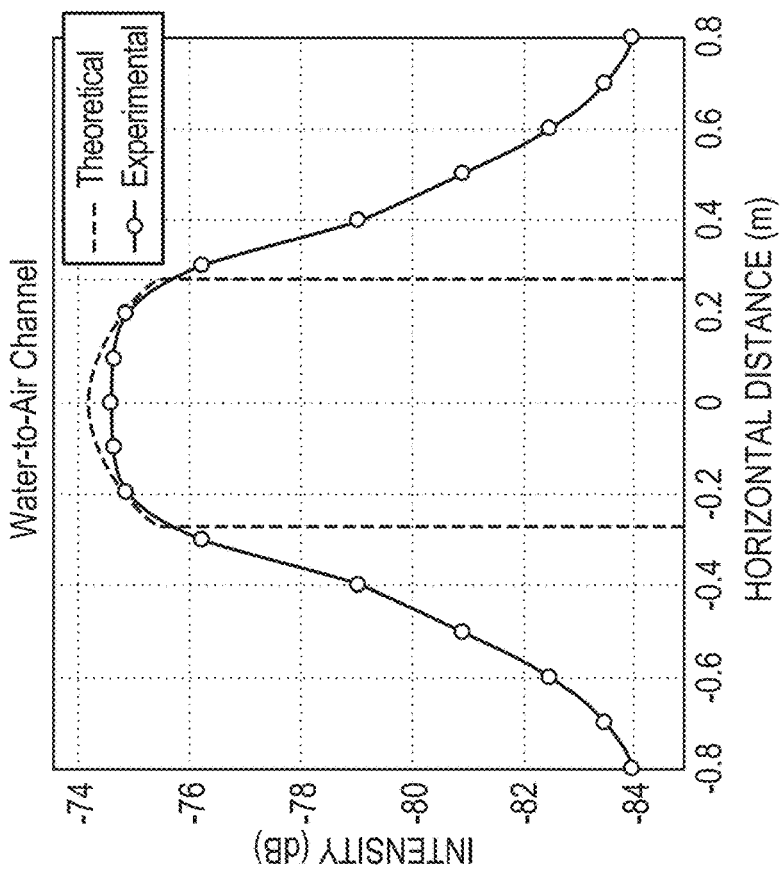
FIGS. 9A-B are graphs illustrating the impact of misalignment on intensity of a received VLC signal in one embodiment.
Figure 9B:
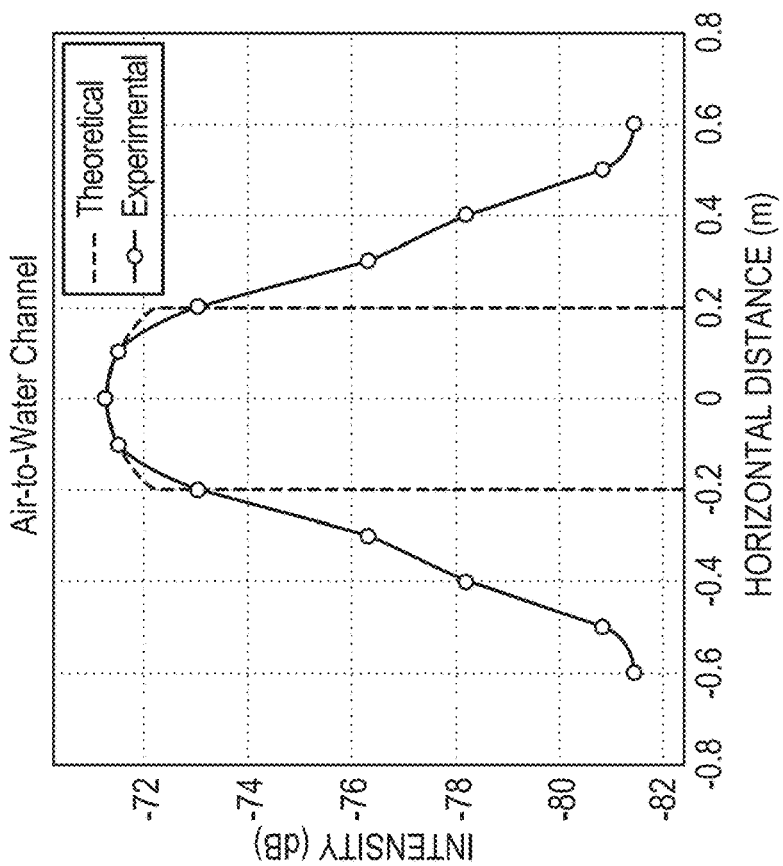

FIGS. 9A-B are graphs illustrating the impact of misalignment on intensity of a received VLC signal for air-to-water (FIG. 9A) and water-to-air (FIG. 9B) configurations as shown in black circle marker. In order to have a clearer visualization, data points are interpolated, as shown in red solid line. Theoretical values are also included in blue solid line for the purpose of validation of the implemented model.

The graphs indicate the impact of misalignment on the light intensity is shown for A2W communication link. It is observed that theoretical model is consistent with the experimental results for the misalignment values less than 0.2 m. Since non-line-of-sight (NLOS) propagation is not included in the theoretical model, it is assumed that for regions larger than radius of 0.2 m is not illuminated. Since the water tank is small enough, considerable intensity of reflections can be gathered. Thus, in practice NLOS propagation contributes to received light intensity for coverage radius larger than 0.2 m. Similar effect of NLOS propagation is observed for W2A communication link for misalignment distance larger than 0.28 m. Due to refraction index difference, light propagating through underwater to air medium reflects with a higher irradiance angle compared to the transmission. Thus, the coverage area for W2A VLC links is higher compared to A2W communication.

Another observation is that even with the NLOS propagation, successful communication links can be maintained. For A2W configuration, BER remains less than $10^{-6}$ for a misalignment distance less than 0.4 m. However, for 0.5 m, BER drastically increases to 0.018. Similarly, for W2A configuration, this misalignment limitation for a communication link with less than $10^{-6}$ BER is increased to 0.7 m. Again for 0.8 m of misalignment, rapid increase of BER to 0.027 is observed. Thus, in practice, by taking into account NLOS propagation, misalignment limitation can be increased compared to the theoretical LOS links. Hence, the coverage areas for A2W and W2A links with given distance of 0.84 m between each modem (equally separated from water surface) are measured to be 0.5 $m^2$ and 1.54 $m^2$ respectively, while maintaining less than $10^{-6}$ BER.

Figure 10A:
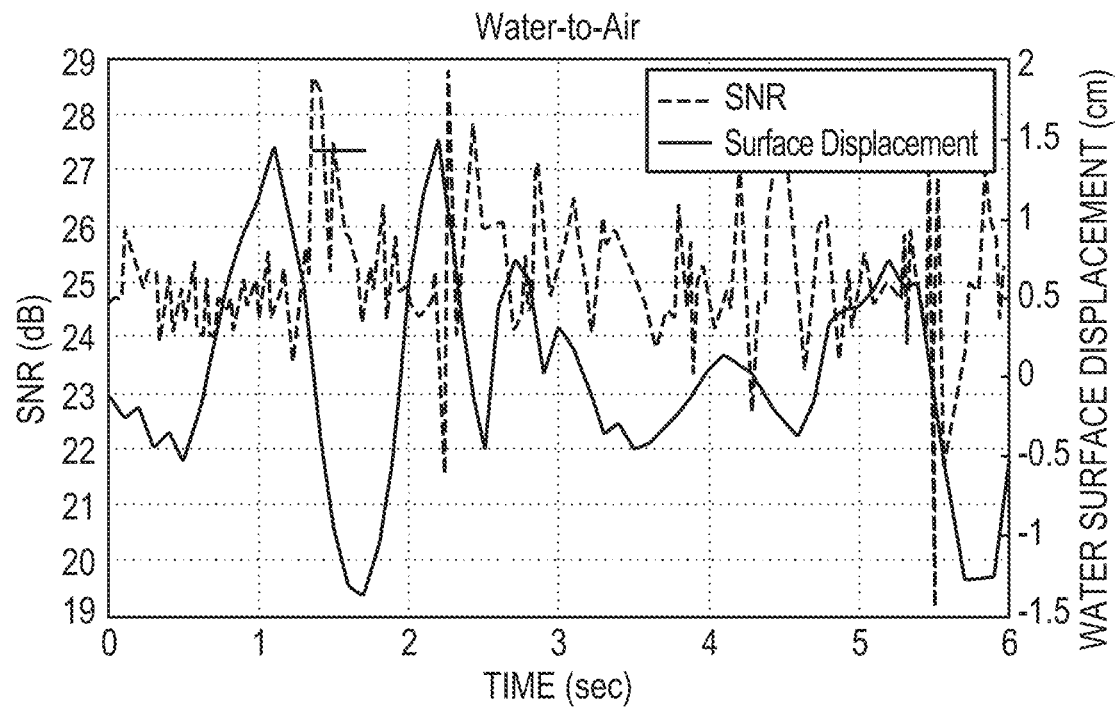
FIGS. 10A-B are graphs illustrating the impact of surface waves on SNR of a received VLC signal in one embodiment.
Figure 10B:
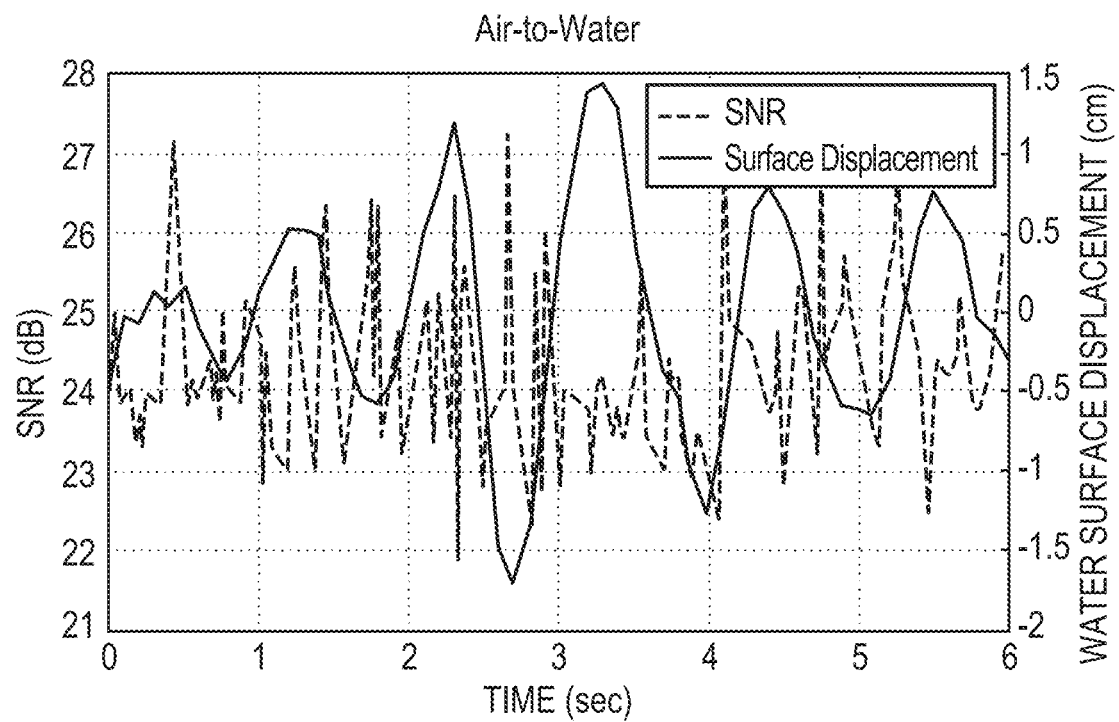

FIGS. 10A-B are graphs illustrating the impact of surface waves on SNR of a received VLC signal undergoing water-to-air (FIG. 10A) and air-to-water (FIG. 10B) propagation, respectively. Another important factor impacting the VLC channel is the presence of surface waves. Until now all the measurements are conducted within a water tank with a flat water surface. However, in real ocean environment absolute flat water surface is unattainable. Thus, to examine the impact of water surface displacement on the received SNR, water surface inside the tank is disturbed to obtain waves.

Specifically, to obtain planar waves inside the tank, 60×60 cm flat plastic object is used for thrusting the water. While establishing VLC link and generating waves, an Arduino module equipped with a acoustic distance sensor is used to record the water displacement. With this setup, maximum of 3 cm peak-to-peak water surface waves could be generated. While SNR differentiation of approximately 0.5 dB is observed for VLC with flat water surface, with the presence of waves, SNR is fluctuated for approximately ±3.5 dB. Despite this huge fluctuation, VLC link is not obstructed and communication with less than $10^{-6}$ BER is maintained for both A2W and W2A configurations.

Although the generated waves are limited to 3 cm, by using the simulation model, communication with different wave heights are simulated. In FIGS. 5A and 5C, A2W and W2A channels with water surface height of 25 cm are simulated. It is shown that according to the received light intensity calculations, communication with less than $10^{-6}$ BER can be obtained, by comparing them to the experimentally received light intensity measurements.

Figure 11:
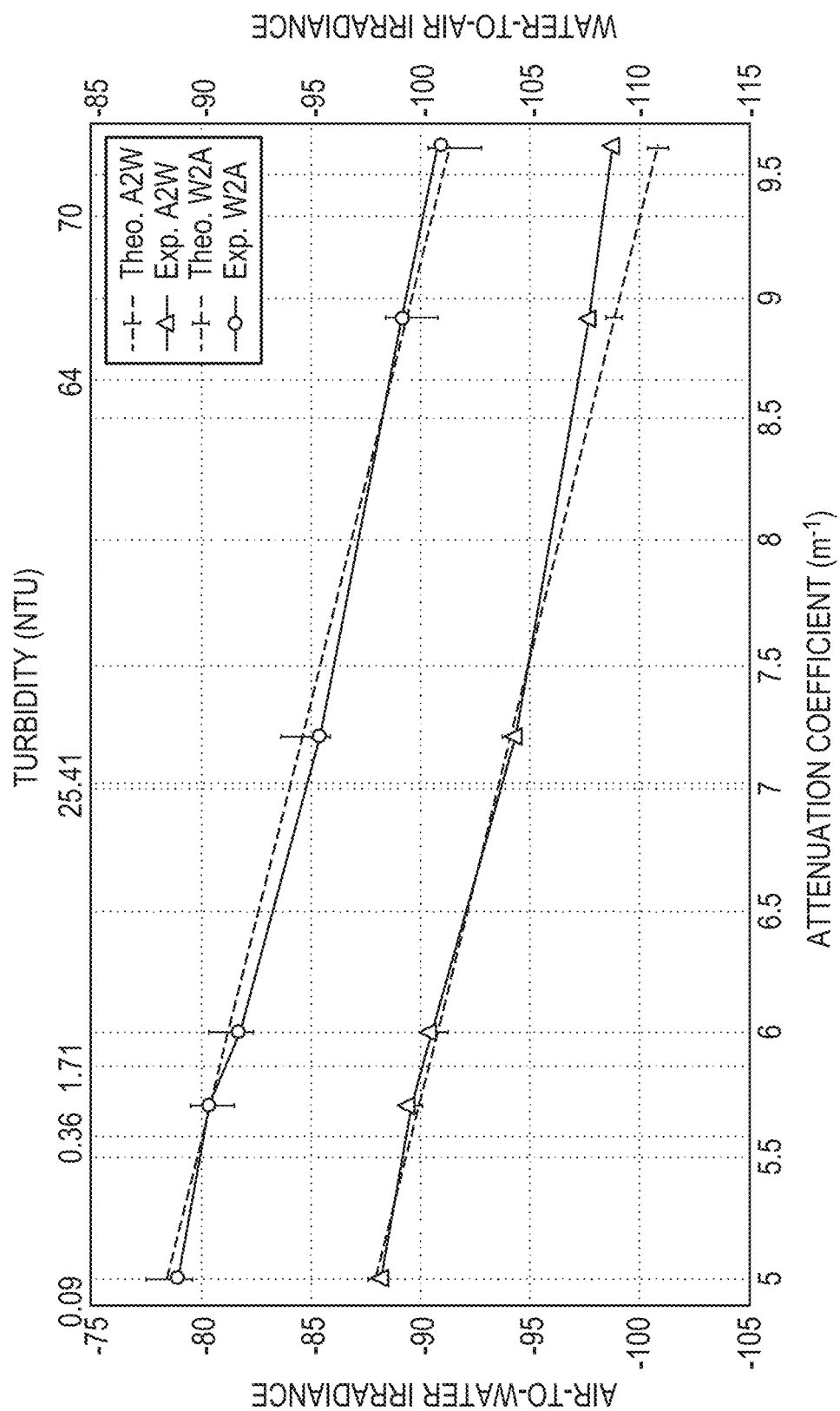
FIG. 11 is a graph illustrating the impact of water clarity on intensity of a received VLC signal in one embodiment.

FIG. 11 is a graph illustrating the impact of water clarity on light intensity of a received VLC for air-to-water and water-to-air propagation. Turbidity values corresponding to each attenuation coefficient is also given in NTU. In order to obtain water turbidity, zinc oxide was implemented. Zinc oxide is widely used for UV protection due to its obstructing effect on UV wavelength, while spectral transmission ratio for visible wavelength is higher than 90%. Thus, by using this material, turbidity of water is increased by generating suspending particles inside the tank, which creates particle scattering for the light rays traveling underwater without creating a spectral absorbance.

Concentration of zinc oxide is gradually increased with 25 gram steps and at every step received RMS values are recorded. Spectrophotometer is used to measure transmittance percentage and absorbance value that is used as the decadic attenuation coefficient for Beer-Lambert Law. While turbidity is measured in nephelometric turbidity unit (NTU), which cannot be converted into attenuation coefficient directly, this unit is used as a point of reference for quality of water. In FIG. 10, water tank with different turbidity levels are shown. As the concentration of ZnO increases, turbidity also increases and subsequently the submerged modem is not clearly visible after some point. Even though the turbidity level of 70 NTU (FIG. 10 (*d*)) is much higher than the average allowed turbidity level in coastal waters, successful VLC link can still be established with the proposed VLC modem as presented in Table I:

TABLE 1

BER and water optical properties (Absorbance (A), Transmittance (T), Turbidity (TU) for different values of ZnO concentration (C).

| C | A | T | TU | BER | |
|---|---|---|----|-----|--|
| (g/m$^3$) | (m$^{-1}$) | (%) | (NTU) | A2W | W2A |
| 0 | 5.00 | 89.1 | 0.09 | <10$^{-6}$ | <10$^{-6}$ |
| 16.78 | 5.41 | 88.4 | 0.36 | <10$^{-6}$ | <10$^{-6}$ |
| 33.57 | 6.01 | 87.0 | 1.71 | <10$^{-6}$ | <10$^{-6}$ |
| 67.14 | 7.00 | 85.3 | 25.42 | <10$^{-6}$ | 2.35 × 10$^{-3}$ |
| 117.49 | 9.01 | 81.0 | 64 | 6.2 × 10$^{-5}$ | 9.63 × 10$^{-3}$ |
| 142.67 | 9.61 | 80.3 | 70 | 2.11 × 10$^{-3}$ | 1.88 × 10$^{-2}$ |

It is observed that for A2W VLC link, experimental results validate the theoretical model (see FIG. 11). However, as the attenuation coefficient or turbidity increases, experimental irradiance value starts to decrease slower than the theoretical values. This is caused by the assumption of Beer-Lambert Law. Beer-Lambert Law disregards the scattered photons that are collected by the photodetector. Thus, it is assumed that scattered photons are disappearing in the theoretical model, which is not the case in practice. Because increase in ZnO concentration also increases scattering of the photons underwater, light rays that penetrates into water medium scatters. Scattered photons are also collected with the photodetector, which results in higher irradiance than the calculated values. For W2A configuration, experimental results hold with the theoretical model more accurately. Detection of scattered photons is not dominant as A2W configuration since the detector is in air medium, where scattered photons mostly remain underwater, unable to penetrate to air medium due to total internal reflection.

Background Noise: To quantify the effect of background noise, measurements obtained using fluorescent bulbs as the noise source. It is observed that indoor lighting (FIGS. 4 (*a*) and (*c*)) decreases the SNR levels depending on the distance between transmitter and receiver modems for every modulation scheme. As the modems are separated by 0.82 m (equal distance to water surface), SNR level decreases by 2 dB. However, if the modems are as close as 0.24 m, SNR decrease is negligible. This is mainly due to the dominant transmitted optical power. If the modems are close to each other, received optical power intensity is dominated by the transmitted blue light. Contrarily, if the modems are separated from each other and background noise's irradiance becomes comparable to the transmitted optical signal, and accordingly received SNR decreases.

Ocean Experiments

In this set of experiments, two software-defined VLC modems used for conducting experiments in coastal ocean water. The goal of this experiments is to demonstrate that the proposed software defined VLC modem can establish bidirectional links through the air-water interface "in-the-wild". Particularly, in this set of experiments, both A2W and W2A channel configurations are tested with CAP and DCO-OFDM modulation schemes providing a 1 Mbit/s of data rate using a 1 MHz bandwidth.

Figure 12:
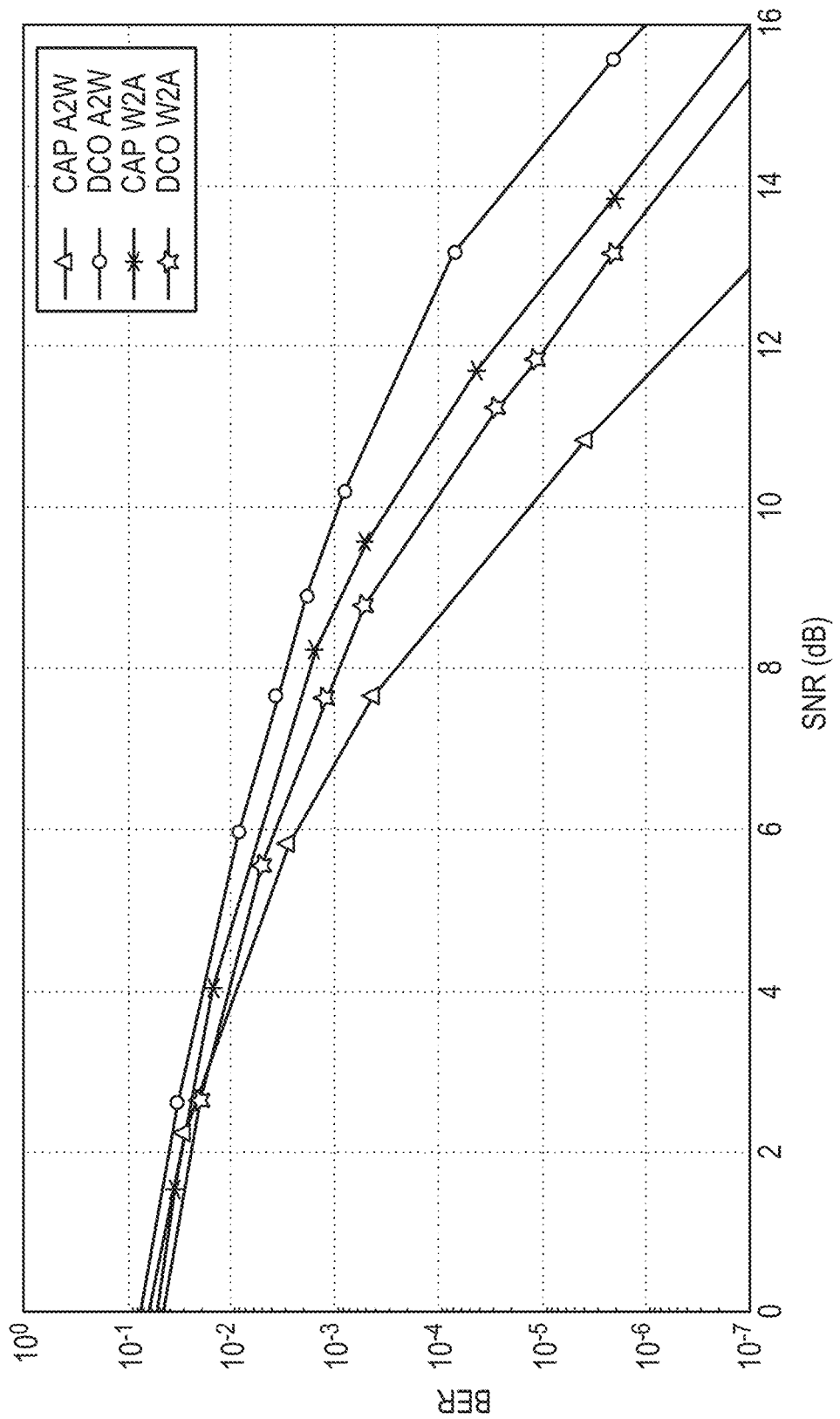
FIG. 12 is a graph illustrating BER as a function of SNR of a received VLC signal in one embodiment.

FIG. 12 is a graph illustrating BER as a function of SNR of a received VLC signal in one embodiment. Experimental setup and water-to-air communication for ocean experiments. (b) BER analysis are conducted in coastal ocean water for both air-to-water and water-to-air configuration at ~1 Mbps for CAP and DCOOFDM modulation schemes.

In a testing setup, prealigned threaded aluminum rods may be used for eliminating any misalignment loss and ease of control over the depth of the modem that is located underwater. Hence, distance between two VLC modems kept fixed 1 m during the experiments. The water clarity of the ocean water is investigated with spectrophotometer and absorbance and transmittance is measured to be 4.90 and 89.4% respectively. FIG. 12 shows the obtained BER-vs-SNR performance results. It can be observed that the results are similar to the water tank experiments. For A2W configuration, CAP scheme outperforms DCO-OFDM at lower SNR values by maintaining lower BER, which is also seen in the tank experiments. Though, for W2A configuration, it is observed that DCO-OFDM performs slightly better than CAP. However, both modulation schemes can maintain communication at SNR values between 7-10 dB for both communication links.

Figure 13:
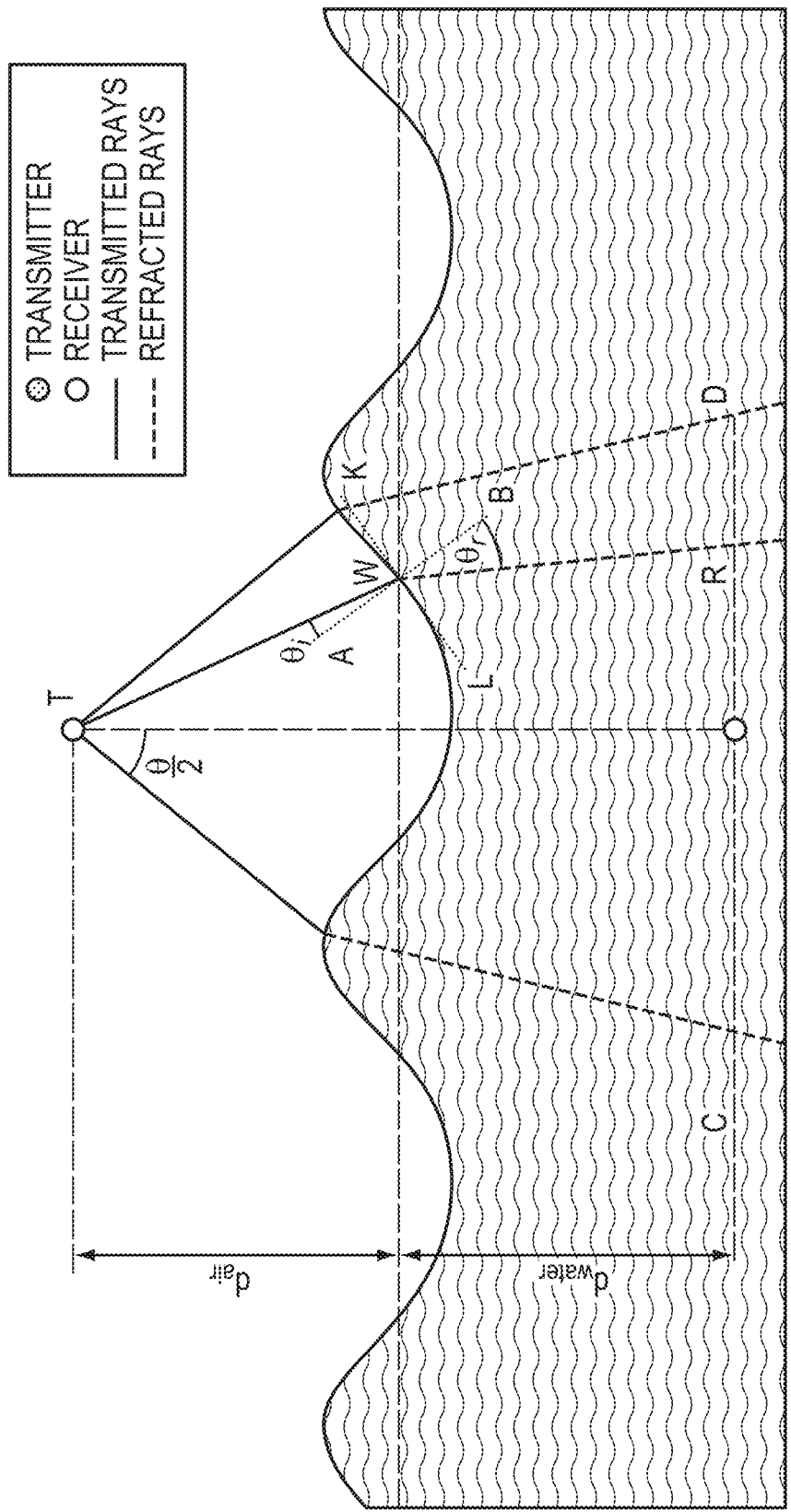
FIG. 13 is a diagram illustrating refraction of a VLC signal at an air-water interface in an example embodiment.

FIG. 13 is a diagram illustrating refraction of a VLC signal at an air-water interface in an example embodiment. Surface water waves are composed of C-noidal waves, where third order Stokes' wave is suitable for such representation and defined as:

$$\eta(x, t) = a\left[\left(1 - \frac{1}{16}(k\alpha)^2\right)\cos\theta + \frac{1}{2}(k\alpha)^2\cos 3\theta\right], \quad (1)$$

where η is the free surface elevation as a function of the horizontal coordinate, x, and time, t. Also, kα is the wave steepness, a is the first order wave amplitude, and θ is defined as the wave phase, which is expressed as θ(x,t)=kx−wt, where k is the wavenumber and w is the angular frequency.

In order to find the incident angle, $\theta_i$, first orthogonal slope of the tangent of the water surface, $m_{AB}$, can be found by using the first derivative of η(x,t). Then the slope of the incoming ray onto the water surface, $m_{TW}$, can be obtained by using the transmitter's position and the incident point of transmitted ray on the water surface. By using $m_{TW}$ and $m_{AB}$, the incident angle can be calculated as $$\theta_i = \tan^{-1}\left|\frac{m_{TW} - m_{AB}}{1 + m_{TW}m_{AB}}\right| \quad (2)$$

After obtaining the refraction angle, $\theta_r$, by using Snell's law, the horizontal coordinate of the incident ray at the depth of the receiver, $m_{WR}$, can be calculated by quadratic expression (4), which is derived from (3) as $$\tan\theta_r = \left|\frac{m_{AB} - m_{WR}}{1 + m_{AB}m_{WR}}\right| \quad (3)$$

$$(m_{AB}^2 \cdot \tan\theta_r^2 - 1) \cdot m_{WR}^2 + 2 \cdot m_{AB}(1 + \tan\theta_r^2) \cdot m_{WR} + \tan\theta_r^2 - m_{AB}^2 = 0. \quad (4)$$

Considering all the path loss components, overall expression for the intensity of light for each incident ray at specific depth, where receiver is located can be calculated as $$I = \frac{2\pi}{\theta} \frac{P}{4\pi \cdot d_{TW}^2} \cdot \tau \cdot e^{-c \cdot d_{WR}} \cdot \frac{(m+1)}{2\pi} \frac{A_R}{d_{WR}} \cos^m\phi, \quad (5)$$

where $d_{WR}$ is the distance between the points of incidence on the water surface and at the depth of the receiver, and c (m$^{-1}$) is the beam attenuation coefficient, which is defined as the sum of absorption, a (m$^{-1}$), and scattering, b (m$^{-1}$), coefficients. Also, $A_R$ is the photodetector area, $\varphi$ is the angle of irradiance, which is equal to $\theta_r$ and m is defined as: m=−1/log$_2$(cos $\Phi_{1/2}$) where $\Phi_{1/2}$ denotes the angle at which the power falls to half.

While example embodiments have been particularly shown and described, it will be understood by those skilled in the art that various changes in form and details may be made therein without departing from the scope of the embodiments encompassed by the appended claims.

What is claimed is:

1. A visible light communication (VLC) system, comprising:
   a transmitter device including:
      a transmitter configured to generate a visible light signal to be transmitted across a VLC channel to a remote device, the VLC channel including an air-water interface; and
      a signal modulator configured to control the transmitter to generate the visible light signal from a digital transmission signal in accordance with a modulation setting;
   a receiver device including:
      a receiver configured to receive a remote visible light signal transmitted across the VLC channel from the remote device;
      a signal demodulator configured to convert the remote visible light signal to a received digital signal; and
   a controller configured to adjust at least one of the visible light signal and a communications protocol based on sensor data indicating multiple properties of the air-water interface of the VLC channel, the multiple properties including 1) a distance to the air-water interface, 2) waves of the air-water interface, and 3) clarity of water at the air-water interface.

2. The system of claim 1, wherein the controller is configured to adjust at least one of the visible light signal and the communications protocol based on at least one of:
   1) A command in the received digital signal,
   2) metadata associated with the remote visible light signal, and
   3) An output of a machine learning (ML) process.

3. The system of claim 2, wherein the metadata includes at least one of bit error rate (BER), symbol error rate (SER), packet error rate (PER), throughput, acknowledgement data of packet reception and signal-to-noise ratio (SNR).

4. The system of claim 1, wherein the controller is further configured to 1) model optical propagation through the air-water interface based on the sensor data indicating the waves of the air-water interface, and 2) adjust at least one of the visible light signal and a communications protocol based on the modeled optical propagation.

5. The system of claim 1, wherein the controller is configured to adjust the visible light signal by modifying at least one of 1) the modulation setting, 2) intensity of the visible light signal, and 3) direction of the visible light signal.

6. The system of claim 1, wherein the modulation setting includes at least one of On-Off keying (OOK) modulation, pulse time modulation (PTM), pulse amplitude modulation (PAM), Carrierless Amplitude and Phase Modulation (CAP) modulation, and Orthogonal Frequency Division Multiplexing (OFDM) modulation.

7. The system of claim 1, wherein the transmitter includes a light-emitting diode (LED) configured to generate the visible light signal at a wavelength between 380 nm and 565 nm.

8. The system of claim 1, wherein the transmitter includes a laser configured to generate the visible light signal.

9. The system of claim 1, wherein the receiver includes a photodetector configured to be responsive to light having a wavelength between 380 nm and 565 nm.

10. The system of claim 1, incorporated into at least one of an unmanned aerial vehicle (UAV), an unmanned underwater vehicles (UUV), and a stationary node.

11. A method of visible light communication (VLC), comprising:
   generating a visible light signal to be transmitted across a VLC channel to a remote device, the VLC channel including an air-water interface;
   controlling a transmitter to generate the visible light signal from a digital transmission signal in accordance with a modulation setting;
   receiving a remote visible light signal transmitted across the VLC channel from the remote device;
   converting the remote visible light signal to a received digital signal; and
   adjusting at least one of the visible light signal and a communications protocol based on sensor data indicating multiple properties of the air-water interface of the VLC channel, the multiple properties including 1) a distance to the air-water interface, 2) waves of the air-water interface, and 3) clarity of water at the air-water interface.

12. The method of claim 11, further comprising adjusting at least one of the visible light signal and the communications protocol based on at least one of:
   1) A command in the received digital signal,
   2) Metadata associated with the remote visible light signal, and
   3) An output of a machine learning (ML) process.

13. The method of claim 12, wherein the metadata includes at least one of bit error rate (BER), symbol error rate (SER), packet error rate (PER), throughput, acknowledgement data of packet reception and signal-to-noise ratio (SNR).

14. The method of claim 11, further comprising modeling optical propagation through the air-water interface based on the sensor data indicating the waves of the air-water interface, wherein adjusting the at least one of the visible light signal and a communications protocol is based on the modeled optical propagation.

15. The method of claim 11, further comprising adjusting the visible light signal by modifying at least one of 1) the modulation setting, 2) intensity of the visible light signal, and 3) direction of the visible light signal.

16. The method of claim 11, wherein the modulation setting includes at least one of On-Off keying (OOK) modulation, pulse time modulation (PTM), pulse amplitude modulation (PAM), Carrierless Amplitude and Phase Modulation (CAP) modulation, and Orthogonal Frequency Division Multiplexing (OFDM) modulation.

17. The method of claim 11, further comprising generating the visible light signal at a wavelength between 380 nm and 565 nm via a light-emitting diode (LED).

18. The method of claim 11, wherein the visible light signal is a laser beam.

19. The method of claim 11, wherein receiving the remote visible light signal includes receiving the remote visible light signal via a photodetector configured to be responsive to light having a wavelength between 380 nm and 565 nm.

20. The method of claim 11, operated by at least one of an unmanned aerial vehicle (UAV), an unmanned underwater vehicles (UUV), and a stationary node.

21. A visible light communication (VLC) system, comprising:
a transmitter device including:
a transmitter configured to generate a visible light signal to be transmitted across a VLC channel to a remote device, the VLC channel being submerged entirely in water; and
a signal modulator configured to control the transmitter to generate the visible light signal from a digital transmission signal in accordance with a modulation setting;
a receiver device including:
a receiver configured to receive a remote visible light signal transmitted across the VLC channel from the remote device;
a signal demodulator configured to convert the remote visible light signal to a received digital signal; and
a controller configured to adjust at least one of the visible light signal and a communications protocol based on sensor data indicating multiple properties of the air-water interface of the VLC channel; the multiple properties including 1) a distance to the air-water interface, 2) waves of the air-water interface, and 3) clarity of water at the air-water interface.

* * * * *